United States Patent
Chan et al.

(10) Patent No.: US 7,680,202 B2
(45) Date of Patent: Mar. 16, 2010

(54) DIGITAL WIRELESS AUDIO COMMUNICATION SYSTEM EMPLOYING TIME DIVERSITY

(75) Inventors: Chee Oei Chan, Singapore (SG); Beng Huat Chua, Singapore (SG)

(73) Assignee: FreeSystems Pte Ltd, Singapore (SG)

( * ) Notice: Subject to any disclaimer, the term of this patent is extended or adjusted under 35 U.S.C. 154(b) by 1128 days.

(21) Appl. No.: 11/269,372

(22) Filed: Nov. 8, 2005

(65) Prior Publication Data

US 2007/0104248 A1    May 10, 2007

(51) Int. Cl.
    H04B 7/02    (2006.01)
(52) U.S. Cl. .................. 375/267; 375/347; 375/295; 375/299; 375/130; 375/138; 375/242; 375/254; 375/285
(58) Field of Classification Search ............ 375/347, 375/295, 299, 130, 138, 242, 254, 267, 285, 375/133
    See application file for complete search history.

(56) References Cited

U.S. PATENT DOCUMENTS

| | | | | |
|---|---|---|---|---|
| 5,197,873 A * | 3/1993 | Wong et al. | ................. | 433/9 |
| 5,692,018 A | 11/1997 | Okamoto | ................. | 375/347 |
| 5,694,438 A | 12/1997 | Wang et al. | ................. | 375/347 |
| 5,850,419 A | 12/1998 | Todoroki | ................. | 375/267 |
| 5,883,928 A | 3/1999 | Eaton | ................. | 375/347 |
| 6,130,915 A | 10/2000 | Hallier et al. | | |
| 6,301,313 B1 | 10/2001 | Gevargiz et al. | ............ | 375/340 |
| 6,510,182 B1 | 1/2003 | Lee et al. | ................. | 375/259 |
| 6,614,849 B1 | 9/2003 | Chan et al. | ................. | 375/259 |
| 6,985,434 B2 | 1/2006 | Wu et al. | | |
| 7,336,601 B2 | 2/2008 | Wu et al. | | |
| 2004/0141568 A1 | 7/2004 | Huat | ................. | 375/295 |
| 2004/0152479 A1 | 8/2004 | Rainbolt et al. | | |
| 2005/0002480 A1 | 1/2005 | Chua | ................. | 375/347 |

FOREIGN PATENT DOCUMENTS

| | | |
|---|---|---|
| EP | 1 185 001 B | 3/2002 |
| EP | 1 185 001 A3 | 8/2003 |

(Continued)

OTHER PUBLICATIONS

Co-pending U.S. Appl. No. 11/269,374, filed Nov. 8, 2005, assigned to the same assignee, "A Digital Wireless Audio Transmitter System Employing Time Diversity".

(Continued)

*Primary Examiner*—Chieh M Fan
*Assistant Examiner*—Siu M Lee
(74) *Attorney, Agent, or Firm*—Saile Ackerman LLC; Stephen B. Ackerman; Billy Knowles

(57) ABSTRACT

A communication system that transfers digital data on a fixed frequency channel of a radio frequency band in the presence of interference from at least one FHSS interference source includes a time diversity generation circuit. The time diversity circuit compacts a duration of data frames then replicate the time compressed data frames. The duplicated time compressed frames of data are transmitted to a communication receiver that has a time diversity data recovery circuit. The time diversity data recovery circuit buffers the received compressed and replicated data frames, evaluates whether each of the duplicated time compressed data frames are received correctly. If any one of the duplicated time compressed data frames is destroyed, the copy of the destroyed duplicated time compressed data frame is used to recover the data frame.

32 Claims, 10 Drawing Sheets

FOREIGN PATENT DOCUMENTS

WO PCT/IB 2006/003048     4/2008

OTHER PUBLICATIONS

Co-pending U.S. Appl. No. 11/269,373, filed Nov. 8, 2005, assigned to the same assignee, "A Digital Wireless Audio Transmitter System Employing Time Diversity".

"Interference Rejection in Digital Wireless Communications", by J.D. Laster et al., IEEE Signal Proc. Mag., May 1997, pp. 37-62.

"Cochannel Interference Suppression Through Time/Space/Diversity", A.R. Calderbank et al., IEEE Trans. on Info. Theory, vol. 46, No. 3, May 2000, pp. 922-932.

"Rejection of Bluetooth Interference in 802.11 WLANs", by Amir Soltanian et al., 2002 IEEE, 0-7803-7467-3/02, pp. 932-936.

\* cited by examiner

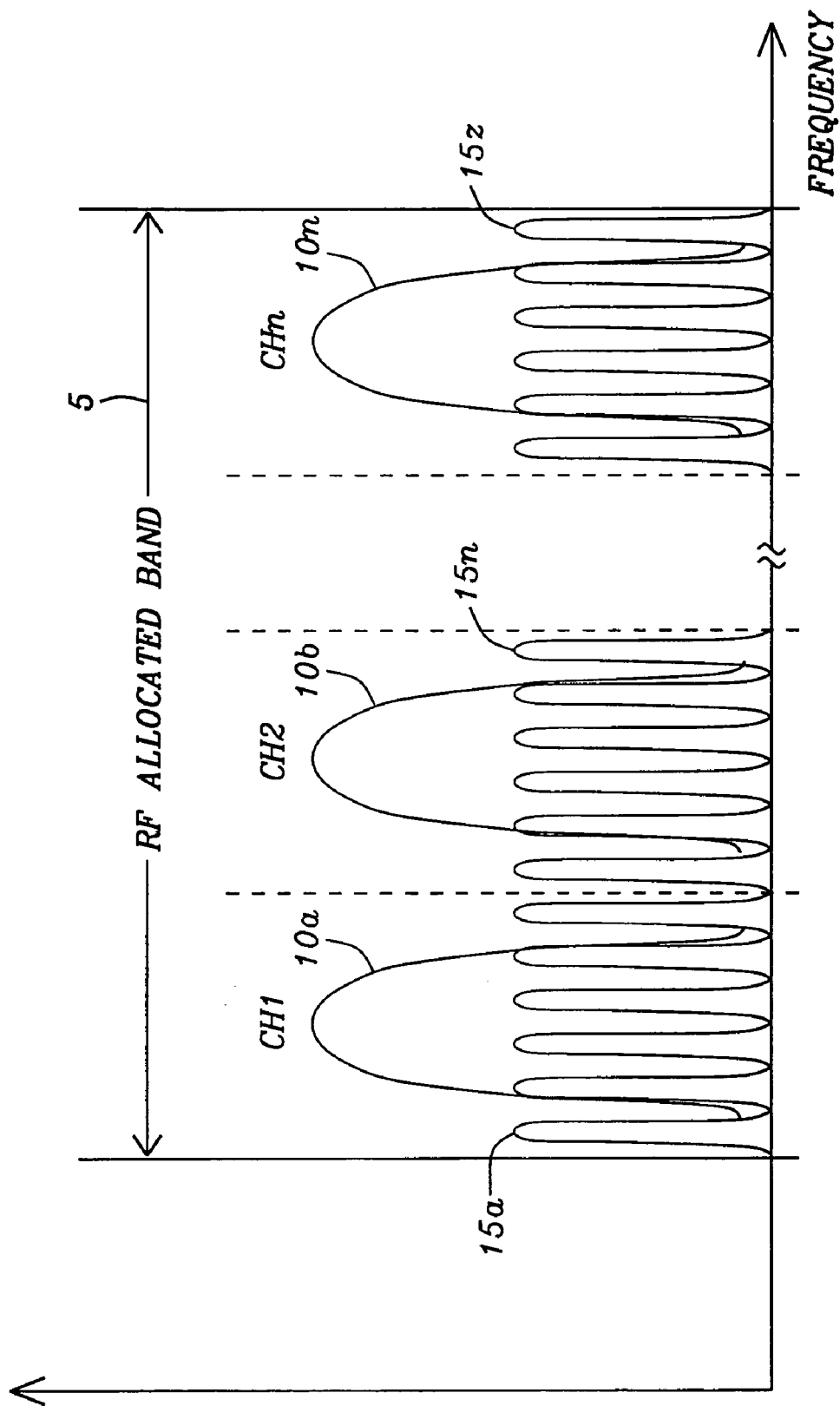
FIG. 1α

DIGITAL WIRELESS AUDIO COMMUNICATION SYSTEM EMPLOYING TIME DIVERSITY

RELATED PATENT APPLICATIONS

"A Digital Wireless Audio Transmitter System Employing Time Diversity," Ser. No. 11/269,374, Filing Date: Nov. 8, 2005, assigned to the Same Assignee as the present invention.

"A Digital Wireless Audio receiver System Employing Time Diversity," Ser. No. 11/269,373, Filing Date: Nov. 8, 2005, assigned to the Same Assignee as the present invention.

BACKGROUND OF THE INVENTION

1. Field of the Invention

This invention relates to circuits and methods for transmission and reception of digital data communication signals. More particularly, this invention relates to circuits and methods for interleaving, compression, duplication, transmission, and recovery of frames of digital data communication signals.

2. Description of Related Art

As is known in the art, the Federal Communications Commission (FCC) allowed type-approved and unlicensed use for a shared and lower-tier occupant in the industrial, scientific, and medical (ISM) radio bands around 915 MHz, 2.442 GHz, and 5.750 GHz. This allocation of the radio spectrum has spurred increased use of spread-spectrum communications. The fact that this radio spectrum allocation is shared is important. Other users, and therefore other signals, either fixed frequency or spread spectrum, are present in these ISM bands and may cause radio frequency (RF) interference.

RF interference is caused by un-wanted RF signals occupying at the same frequency as an intended signal thus resulting in a loss of information—either audio or digital data. The key factors that effect the level of RF interference are the relative signal strength between the intended and the unwanted signal, the bandwidth of the unwanted signal that of the intended signal, the relative time that the unwanted signal occupies the same bandwidth as the intended signal. The relative signal strength is typically defined under an RF co-channel selectivity specification. The relative time that the unwanted signal occupies the same bandwidth relates typically to Frequency Hopping Spread Spectrum (FHSS) transmission systems when the FHSS transmission systems are occupying the same bandwidth as that of a fixed frequency transmission system.

Since the ISM radio bands are unlicensed, the fixed frequency applications are for example wireless networking solutions, radio frequency identification tags, alarm systems, and security monitoring, home automation, garage door openers, automatic meter reading, and remote sensors, and digital audio transmission. Similarly, the FHSS ISM band applications include digital wireless networking such as Bluetooth network, cordless telephones, and microwave telecommunications. The fixed frequency applications divide the ISM radio bands into separate channels or sub-bands.

Each fixed frequency application occupies one of the channels or sub-bands and is isolated from other nearby applications occupying other channels or sub-bands. The FHSS applications divide the ISM radio bands into similar channels, but with narrower bandwidth and occupy each of the channels for a short period of time. The FHSS applications hop from channel to channel in a prescribed hopping pattern such as a pseudo random hopping pattern and may actually interfere with a fixed frequency application for sufficient time to cause interruption in the application. For instance the Bluetooth specification divides the ISM radio band into 79 channels with a 1 MHz bandwidth. The Bluetooth specification calls for the transmitter to make 1600 hops from channel to channel per second. If a fixed frequency application divides the ISM band into 10 channels, a Bluetooth transmission may occupy the fixed frequency band 6.25 msec of every second. This is sufficient to cause distortion and errors in the fixed frequency application.

"Interference Rejection in Digital Wireless Communications", Laster, et al., IEEE Signal Processing Magazine, May 1997, Vol.: 14, Issue: 3, pp.: 37-62 comprises a literature review of published papers pertaining to single-channel adaptive interference rejection in digital wireless communication. Techniques for the suppression of co-channel interference are discussed for spread spectrum frequency hopping transmission schemes and non spread spectrum schemes.

"Cochannel Interference Suppression Through Time/Space Diversity" Calderbank et al., IEEE Transactions on Information Theory, May 2000, Vol.: 46, Issue: 3, pp.: 922-932 describes how to achieve interference suppression and mitigation of fading through diversity in time provided by channel coding. The mathematical description of time diversity is identical to that of space diversity, and what emerges is a unified framework for signal processing. Decoding algorithms are provided for repetition codes, rate 1/n convolutional codes, first-order Reed-Muller codes, and a new class of linear combination codes that provide cochannel interference suppression. In all cases it is possible to trade performance for complexity by choosing between joint estimation and a novel low-complexity linear canceller structure that treats interference as noise.

"Rejection of Bluetooth Interference in 802.11 WLANs", Soltanian et al., Proceedings IEEE Vehicular Technology Conference, 2002. Vol.2, pp.: 932-936 vol.2, investigates the use of complex coefficient adaptive filters for interference suppression in the direct sequence spread spectrum IEEE 802.11b system. The parameters of a recursive least-squares lattice filter are determined to mitigate the effect of a hopping narrowband interferer such as Bluetooth.

U.S. Pat. No. 5,692,018 (Okamoto) describes an interference canceller that has a complex multiplier for multiplying a signal recovered from a quadrature modulated carrier by a correlation value, and a another complex multiplier for multiplying a delayed version of the recovered signal by a another correlation value. The outputs of the multipliers are additively combined in an adder and subtractively combined in a subtractor. The output of the adder is amplified by an AGC amplifier to produce a reference signal representative of the envelope of the adder output. First correlation between the recovered signal and the reference signal is detected and the first correlation value is derived. A second correlation is detected between the delayed version of the recovered signal and the reference signal and the second correlation value is derived. One of the outputs of the amplifier and the subtractor is selected by a selector. A decision feedback equalizer operates on the output of the selector to produce a decision output and a decision error. The decision error is compared with a threshold value and the selector is controlled depending on whether the decision error is higher or lower than the threshold value.

U.S. Pat. No. 5,694,438 (Wang, et al.) teaches a method and apparatus for managing a data symbol received in a time diversity communication system. A current data symbol is received by a receiver in a frame of data of a time diversity communication system. A symbol counter counts a signal from a symbol clock synchronized to the frame of data to provide a count of the current data symbol, and a bit line translator maps a current address from the count. A conditional processor derives a selected memory address from the current address. Then, based upon the current address, a comparator makes a choice among storing the current data symbol in a memory at the selected memory address, merging the current data symbol with an earlier received data symbol stored at the selected memory address during an earlier frame of data, and ignoring the current data symbol.

U.S. Pat. No. 5,850,419 (Todoroki) details a time diversity communication system. In the time diversity communication system, loss of data or generation of incorrect data may occur due to, for example, the shadow effect. On the transmission side, an interlaced signal is generated in which the input digital signal string is combined with the same signal string delayed by n bits, k redundancy bits are added to every m bits of this signal, the signal is divided into blocks of (m+k) bits, an interleaving process is executed for every j blocks in which unique words are added, following which the signal is transmitted. On the receiving side, unique words are detected, a de-interleaving process is performed, and a check is made for the presence of error signals. The delayed and non-delayed signals are next separated from the decoded data, and depending on the state of the signals, the desired signal is selected at selector and outputted. A conformity judgment circuit judges conformity with the separated signal determined to be effective using effective gate signals indicating the effectiveness or ineffectiveness of decoded data, performs switching control of the separated signals, and monitors synchronization.

U.S. Pat. No. 5,883,928 (Eaton) describes a time diversity radio communication system. The time diversity system includes a radio receiving device. The time diversity system receives a temporary address, a group message associated with the temporary address, and an instruction vector for activating the temporary address as original information and, subsequently, duplicate information in a radio signal having frames of data. When the original instruction vector is not received by the receiving device, a later frame is searched for the duplicate instruction vector, which, when located, activates the temporary address stored by the receiving device. The receiving device then determines which frame is capable of reception by the receiving device includes the group message and the receiving device searches for the temporary address and the group message in that frame. The temporary address is then deactivated.

U.S. Pat. No. 6,301,313 (Gevargiz, et al.) teaches a mobile digital radio system. A plurality of satellites and terrestrial repeaters transmit substantially identical information that is contained in an original time division multiplexed data stream. Each satellite transmits on a separate frequency band, and all terrestrial repeaters transmit on one shared frequency band. A mobile receiver simultaneously processes the frequency bands. The receiver selectively parses and concatenates a plurality of time division multiplexed data streams to substantially recompose the original data stream. The output may be a high fidelity audio signal, data for display, or a combination of audio and displayed data.

SUMMARY OF THE INVENTION

An object of this invention is to provide a communication system that is robust for transfer of digital data on a fixed frequency channel of a radio frequency band in the presence of interference from at least one FHSS interference source.

To accomplish at least this object, a communication system for the transfer of digital data on a fixed frequency channel has a communication transmitter that includes a time diversity generation circuit. The time diversity generation circuit includes a frame data rate multiplier to receive data frames to increase a data transfer rate of at least one grouping of the data frames to time compress the groupings of the data frames. A data frame duplicator is in communication with the frame data rate multiplier to receive the time compressed interleaved groupings of data frames, and duplicate the time compressed formatted frames of data. The duplicated time compressed groupings of data frames are transmitted serially by the transmitter on a fixed frequency channel in the presence of the interference to allow reception of all time compressed groupings of data frames in spite of the interference.

The communication system further has a receiver with a time diversity data recovery circuit. The time diversity data recovery circuit has a diversity receiver to receive duplicated time compressed data frames that are transmitted on a fixed frequency channel in the presence of interference from at least one frequency hopping spread spectrum interference source. The time diversity data recovery circuit then extracts the duplicated time compressed data based on a transmission data rate multiplication factor and a data frame length grouping number. A data frame buffer is in communication with the diversity receiver to receive the transmission data rate multiplication factor and the data frame length grouping number to allocate buffer locations within the data frame buffer and to receive the duplicated time compressed data frames. An error detection and correction circuit in communication retrieves sequentially the duplicated time compressed data frames from the data frame buffer. The error detection and correction circuit evaluates whether each of the duplicated time compressed data frames are received correctly. If the time compressed data frames are not received correctly and have been destroyed by the interference, a duplicate copy of any of the destroyed time compressed data frames is retrieved from the data frame buffer and evaluated if it not destroyed. The error detection and correction circuit then evaluates the duplicate copy of the time compressed data frames to determine that they are correct. If they are correct, they are tagged as "good" and placed with the original time compressed data frames within the data frame buffer. The data frame buffer orders the duplicated time compressed data frames in order locations to allow ordered retrieval of the data frames by the error detection and correction circuit.

The time diversity generation circuit further provides a generation interference evaluation circuit in communication with a receiver associated with the transmitter to receive an interfering signal from at least one frequency hopping spread spectrum source. From the interfering signal; the generation interference evaluation circuit derives an interference signature indicative of a hopping pattern, duration of each hop, a total transmission duration, a magnitude of the transmission power relative to intended received power, and a bandwidth of the transmission during each hop. From the interference signature, the generation interference evaluation circuit evaluates a transmission data rate multiplication factor and a data frame length grouping number indicative of a number of data frames included within a grouping and the data transfer rate, which can avoid the interfering signal. The generation interference evaluation circuit is in communication with the frame data multiplier to receive the transmission data rate multiplication factor to determine the data transfer rate for each grouping of data frames and in communication with the data frame duplicator to receive the data frame length grouping number to determine the number of data frames include in each grouping of data frames.

The receiver may receive a feedback message transmitted from a remote receiving system. The message contains the transmission data multiplication factor and data frame length grouping number. The message is transferred to the interference evaluation circuit for transfer to the frame data rate multiplier and the data frame duplicator for time compressing the groupings of the interleaved data frames and duplicating the time compressed data frames.

The duplications of the time compressed groupings of data frames may be fixed at two. Alternately the data transfer rate is a function of a transmission data rate multiplication factor that is determined by the number of data frames obstructed by the interference and a bandwidth of the interference. The transmission data rate multiplication factor is determined by the formula:

$$TDRMF = \lceil \frac{N_f}{n}$$

where:
TDRMF is the transmission data rate multiplication factor,
$\lceil$ is the next greatest integer or the result of rounding up to the next greatest integer (ceiling), $$N_f = \lceil \frac{t_{window}}{t_{frame}},$$

$N_f$ is the data frame length grouping number indicative of the number of data frames in a window and is an integer multiple for the duration of the data frame,
$t_{window}$ is the maximum time of the window in which data frames are duplicated,
$t_{frame}$ is the duration for each data frame, $$n = \lceil \frac{m \tau_{FHSS}}{t_{frame}},$$

n is the number of frames obstructed by the interference,
m is the number of FHSS channels within the fixed frequency channel, and
$\tau_{FHSS}$ is frequency hopping spread spectrum channel interference duration.

Upon determining the transmission data rate multiplication factor and the data frame length grouping number, the transmission data rate multiplication factor and the data frame length grouping number are placed within a header of the data frames.

The time diversity data recovery circuit further provides a recovery interference evaluation circuit within the receiver to the receive an interfering signal of the frequency hopping spread spectrum interference source. From the interfering signal, the recovery interference evaluation circuit derives an interference signature indicative of a hopping pattern, duration of each hop, a total transmission duration, a magnitude of the transmission power relative to intended received power, and a bandwidth of the transmission during each hop. From the interference signature, the recovery interference evaluation circuit evaluates a transmission data rate multiplication factor and a data frame length grouping number indicative of a number of data frames included within a grouping and the data transfer rate, which can avoid the interfering signal.

The recovery interference evaluation circuit communicates an interference notification signal to the diversity receiver. The diversity receiver then extracts an embedded transmission data rate multiplication factor and an embedded data frame length grouping number from a header of the duplicated time compressed data frames. If recovered data frames are not correctable as a result of interference from the frequency hopping spread spectrum source, the interference evaluation circuit communicates a request for a new transmission data rate multiplication factor and a new data frame length grouping number to a communication transmitter transmitting on the fixed frequency channel.

Alternately, if recovered data frames are not correctable as a result of interference from the frequency hopping spread spectrum source, the interference evaluation circuit receives an external channel request to communicate the request for the new transmission data rate multiplication factor and the new data frame length grouping number to the communication transmitter transmitting on the fixed frequency channel.

The frequency hopping spread spectrum interference sources maybe from Bluetooth compliant sources or cordless telephones.

BRIEF DESCRIPTION OF THE DRAWINGS

FIG. 1a is a plot of frequency versus amplitude of illustrating fixed frequency channels and FHSS Channels.

DETAILED DESCRIPTION OF THE INVENTION

Figure 1B:
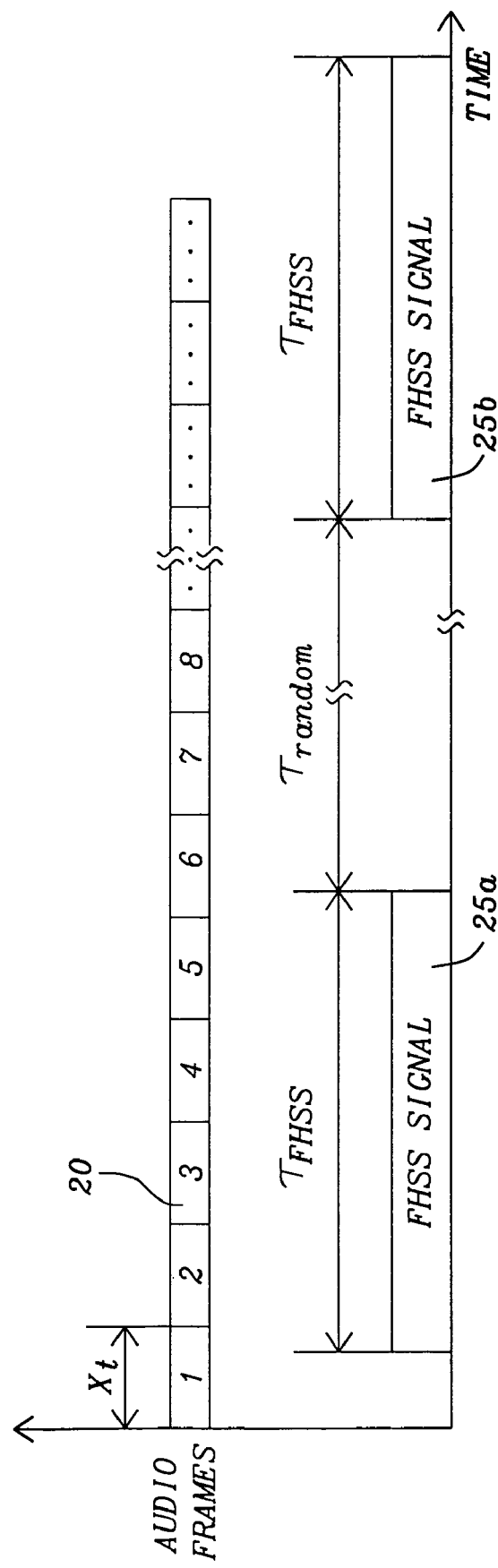
FIG. 1b is a plot of time versus amplitude of illustrating transmission of digital data frames on a fixed frequency channel and FHSS transmission on the FHSS Channels overlapping the fixed frequency channel.

In the fixed frequency communication system of this invention, a transmitter acquires digital data such as digitized audio that has been formed into data frames. The transmitter time compresses the data frames and replicates the data frames based on a compression factor. The transmission data rate multiplication factor is determined by how fast the transmission data rate is to be increased for a grouping of frames to avoid interference from an FHSS interfering source. This increase is by at lease a factor of 2 and may be any multiple of the transmission data rate. By varying the number of frames before being duplicated, the system can then adjust to a maximum period of time that a FHSS source is interfering with the transmission from the transmitter. The compressed, replicated digital data frames are transmitted through the atmosphere to a receiver. The receiver recovers the compressed, replicated digital data and retains the replicated digital data in a storage buffer circuit. An error detection and correction circuit extracts one copy of the replicated digital data from the storage buffer circuit and determines if the digital data has been corrupted. If it is not corrupted the data is transferred for further processing. If the data is corrupted, a copy of the digital data is retrieved from the storage buffer and examined to determine if it is corrupted. If the replicated data frames are not corrupted they are joined with the primary replicated data frames and tagged as good. The group of data frames are then transferred for further processing.

In an example of a digital audio system, the digital data is encoded data frames representing the audio. The digital data is suitably decoded to regenerate the transmitted audio signal. If the multiple copies of the digital data are corrupted, the audio processor declares an error and may mute the audio transmission or provide further processing to interpolate a value of the lost digital data frames from adjacent data frames.

Refer now to FIG. 1a for a description of the problem solved with the time compression and diversity communication system of this invention. As described above the governing bodies of the RF spectrum such as the FCC in the United States assign the RF spectrum into allocated bands 5 for specified usage. In the case of the ISM bands, the usage is non-licensed and differing types of applications are present within the bands. The allocated RF band 5 is further divided into sub-bands or channels $10a, \ldots, 10n$, and $15a, \ldots, 15n, \ldots, 15z$. The number of channels within the allocated RF band 5 being dependent upon the bandwidth required for the application.

In FHSS applications, the number of channels determines the probability that a given sub-channel is occupied at any given time. The hopping rate of the FHSS application determines the amount of time that the sub-channel is occupied. In fixed frequency applications, a channel is occupied anytime the transmitter is radiating to transmit the signal. Thus, if there is an FHSS source and a fixed frequency source in sufficiently close proximity, the FHSS source will cause periodic interference with the fixed frequency source that is sufficient to corrupt the fixed frequency source. For instance, if the RF allocated band 5 is occupied simultaneously by a fixed frequency application $10a, \ldots, 10n$ and a FHSS application $15a, \ldots, 15n, \ldots, 15z$ and the bandwidth of the fixed frequency application $10a, \ldots, 10n$ were a factor (n) greater than the FHSS application $15a, \ldots, 15n, \ldots, 15z$, the amount of time that the FHSS application $15a, \ldots, 15n, \ldots, 15z$ would be interfering with the fixed frequency application $10a, \ldots, 10n$ would be determined by the formula:

$$t_i = n_{bdf}\left(pr(ch) * \frac{1}{f_h}\right) \quad \text{Eq. 1}$$

where:
  $t_i$ is the interference time.
  $n_{bdf}$ is the bandwidth differential factor or the number of channels of the FHSS application $15a, \ldots, 15n, \ldots, 15z$ that overlap one fixed frequency channel $10a, \ldots, 10n$.
  pr(ch) is the probability of one FHSS application channel $15a, \ldots, 15n, \ldots, 15z$ being occupied at a given time and is given by the inverse of the number of channels of the FHSS application $15a, \ldots, 15n, \ldots, 15z$ within the RF allocated band 5.
  $f_h$ is the hopping frequency of the FHSS application $15a, \ldots, 15n, \ldots, 15z$ (i.e. Bluetooth applications have 1600 hops/second.).

It can be shown from the above that the greater the number of FHSS application channels $15a, \ldots, 15n, \ldots, 15z$ within the RF allocated band 5 the less likely that the fixed frequency application $10a, \ldots, 10n$ will have interference, but it will occur. Further, the lower the hopping frequency, the longer that the FHSS application will remain in a given channel $15a, \ldots, 15n, \ldots, 15z$ and the more likely the interference will prevent total fixed frequency communication. Referring to FIG. 1b, a digitized audio signal has a series of audio frames 20 transmitted over time. Each frame has a duration period $x_t$ in which small interference signals maybe able to be corrected with embedded error correction codes. However, if an FHSS signal 25a is transmitted on one of the FHSS channels overlapping the fixed frequency signal channel, the fixed frequency signal is interfered with by the FHSS signal for the time duration $\tau_{FHSS}$ of the FHSS signal dwell within a given FHSS channel. The interference may extend to adjacent FHSS channels within the fixed frequency channel or may return after some random time duration $\tau_{RANDOM}$ and interfere again for the period $\tau_{FHSS}$.

Figure 2:
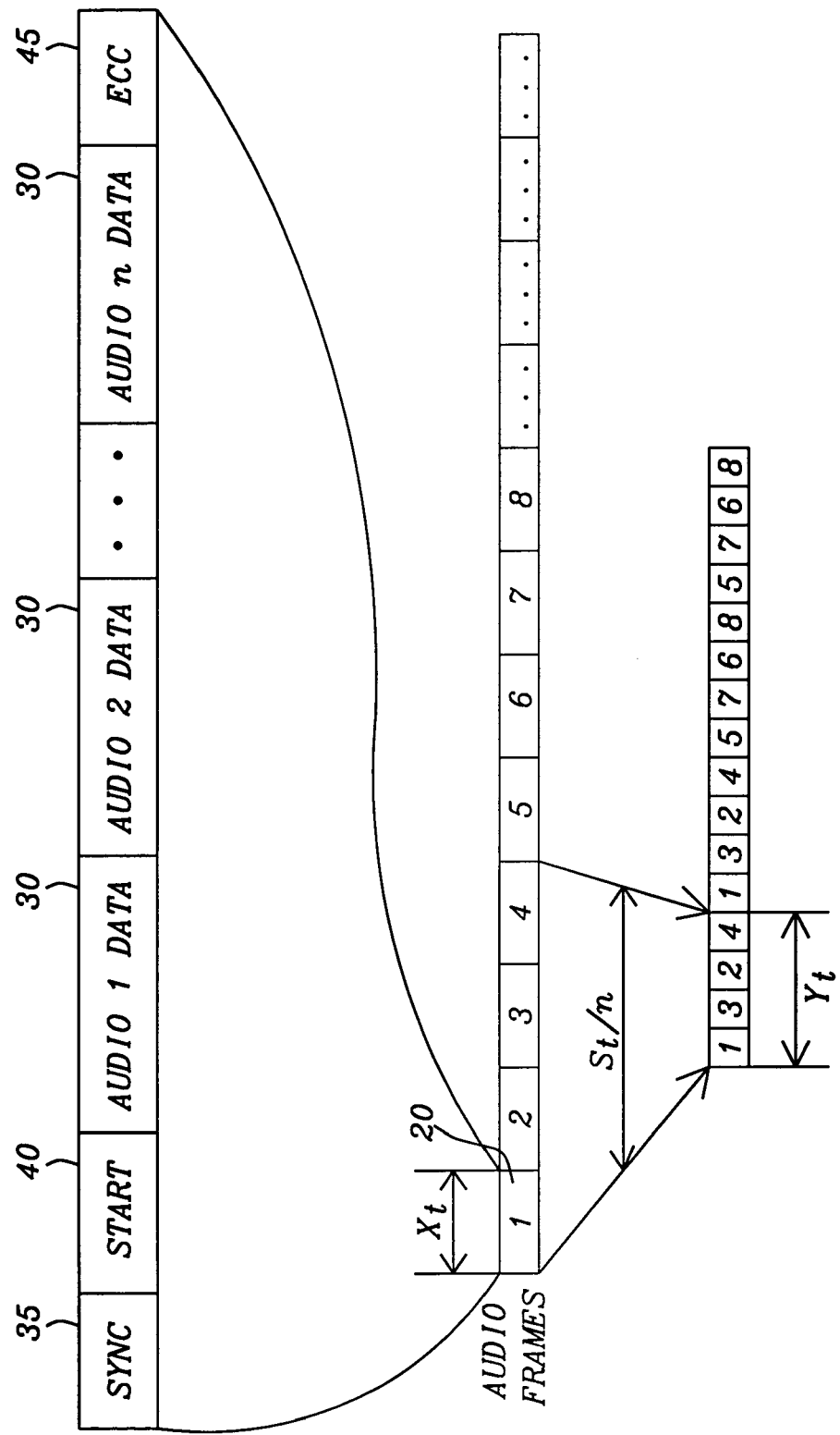
FIG. 2 is a diagram of digital audio frames showing compressing and time diversity of this invention.

The preferred embodiment of the communication system of this invention is the transmission of digital audio data from digital audio source such as a compact disk player or digital audio players. As is known in the art, the conversion from the analog to the digital domain begins by sampling the audio input in regular, discrete intervals of time and quantizing the sampled values into a discrete number of evenly spaced levels commonly referred to as pulse code modulation (PCM). The digital audio data is formatted into groups of data words 30 as shown in FIG. 2. The data words 30 are serialized and appended to form a frame. A synchronization word 35 and a start symbol 40 are appended to the beginning of the frame of data words 30 and a error correction code 45 is appended to the data frame. The error correction code 45 is a forward error correction coding that allows correction from corruption of the audio data words 30 from interference having a duration less than the period $x_t$ of a data frame 30 depending on the complexity of the error correction code.

Each data frame 20 represents the audio and must be encoded and decoded within that period to maintain the frequency of the audio stream. The time for transmission of the data frames 20 is compressed by (i.e. the data rate of the transmission of the data frames 20 is increased or sped up) a factor which allows duplication of data frames. For instance, if the transmission data rate multiplication factor is 2 then, the data frames 20 are duplicated twice. Alternately, if the transmission data rate multiplication factor is 3, the data frames 20 are duplicated three times. By grouping a series of data frames before duplication occurs, it determine amount of time allowed to avoid the continuous interference in that given time Yt. Changing the grouping of the data frame affects the latency of audio playback due to processing time given. However it maintains the frequency of the audio playback stream. In the communication system of this invention, the time period $Y_t$ must be sufficiently large to avoid interference from all FHSS transmissions within the fixed frequency channel over the time duration $\tau_{FHSS}$ for each of the FHSS channels within the fixed frequency channel.

Figure 3A:
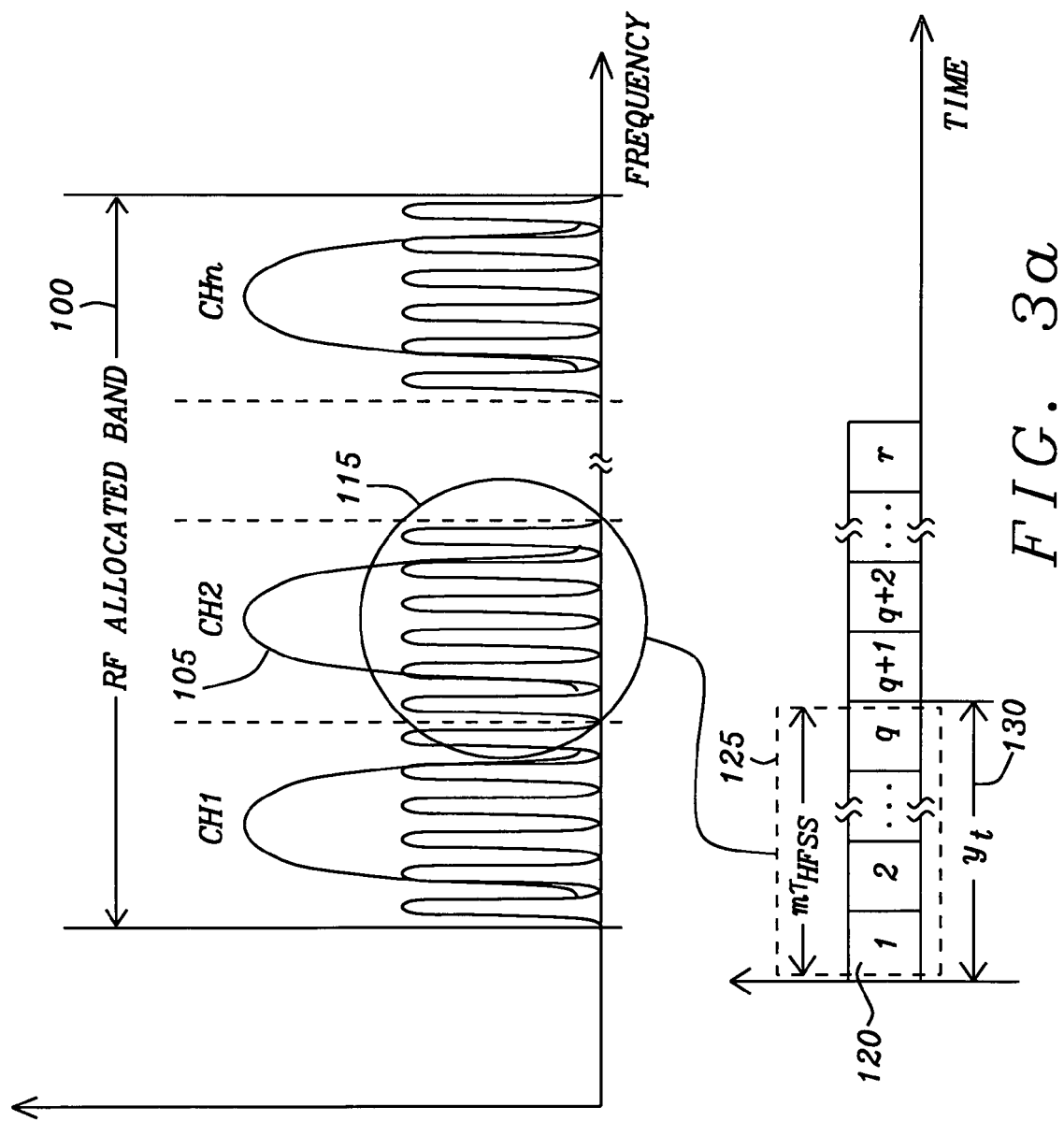
FIG. 3a is a plot of frequency versus amplitude of illustrating a fixed frequency channel being interfered with by FHSS Channels.

Referring to FIG. 3a, a fixed frequency transmission source is assigned a channel 105 of the RF allocated band 100. The FHSS transmission source will be transmitted on channels that overlap the fixed frequency as the ratio of the bandwidth of the fixed frequency channel to the bandwidth of the FHSS channel, such that the fixed frequency channel will include a number (m) of the FHSS channels 115. At some point in time the pseudo-random frequency hopping will have all of the number (m) FHSS channels 115 sequentially occupied. Or the time 125 that the fixed frequency transmission is corrupted by the FHSS transmission is at most the multiple m multiplied by the time duration $\tau_{FHSS}$ for each of the FHSS channels 115. The number of frames 120 of the fixed frequency channel to be replicated is the time of a single frame multiplied by a transmission data rate multiplication factor times the next highest integer number of frames for the amount of time that the FHSS transmission source will be interfering with the fixed frequency transmission source. The transmission data multiplication factor is a fixed factor employed in the presence of the interference and is determined by the formula:

$$TDRMF = \lceil \frac{N_f}{n} \rceil \qquad \text{Eq. 2}$$

where:
  TDRMF is the transmission data rate multiplication factor.
  $\lceil$ is the next greatest integer or the result of rounding up to the next greatest integer (ceiling).

$$N_f = \lceil \frac{t_{window}}{t_{frame}} \rceil.$$

$N_f$ is the data frame length grouping number indicative of the number of data frames in a window and is an integer multiple for the duration of the data frame,
  $t_{window}$ is the maximum time of the window in which data frames are duplicated.
  $t_{frame}$ is the duration for each data frame.

$$n = \lceil \frac{m \tau_{FHSS}}{t_{frame}} \rceil.$$

n is the number of frames obstructed by the interference.
  m is the number of FHSS channels within the fixed frequency channel.
  $\tau_{FHSS}$ is frequency hopping spread spectrum channel interference duration.

Figure 3B:
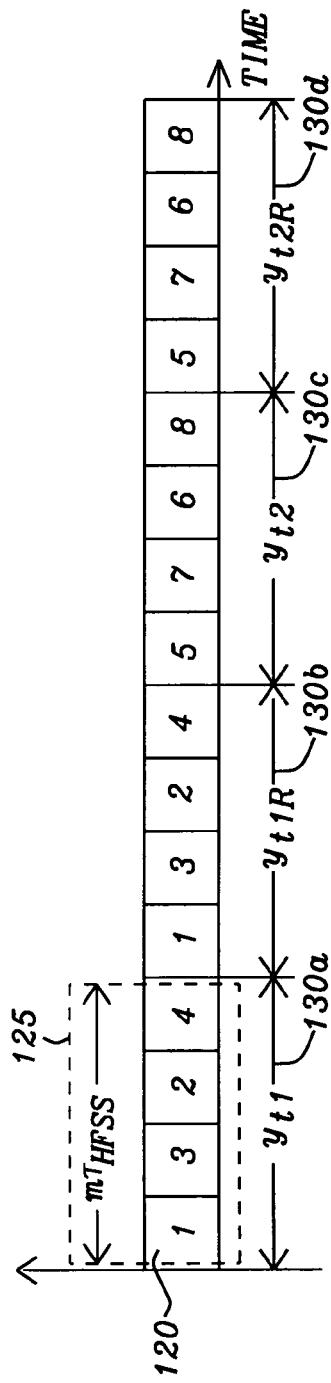
FIG. 3b is a plot of frequency versus amplitude of illustrating an example of a fixed frequency channel being interfered with by FHSS Channels.

Referring to FIG. 3b for an explicit example of the transmission data rate multiplication factor and time diversity replication of a transmission of this invention. The total possible interference time $\tau_{FHSS}$ of the FHSS transmission for all the FHSS channels that overlap the fixed frequency transmission after compression is determined to be between three and four data frames 120 and is therefore rounded to four of the fixed frequency data frames. These data frames have a time of $Y_{t1}$, 130a and are replicated during the time $Y_{t1R}$ 130b. Similarly, all subsequent sets of four data frames 120 are replicated during the subsequent time $Y_{t2}$ 130c and $Y_{t2R}$ 130d. This replication allows a relatively long time of interference with no effect on the reception of the fixed frequency transmission. Each data frame 120 is likely to be received with not corruption. Further, reordering the data frames 120 permits appropriate muting and interpolation for digital audio to prevent long term distortion of the audio.

Figure 4:
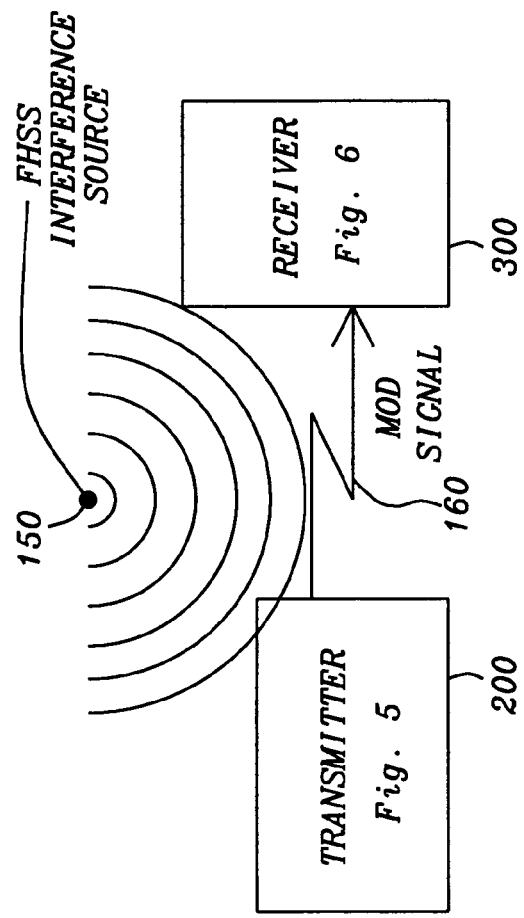
FIG. 4 is a block diagram of a communication system of this invention incorporating time compression and diversity of this invention in the presence of interference from a FHSS interference source.

Refer now to FIG. 4 for a discussion of the communication system of this invention. The transmitter 200 transmits a the data frames as described above on a fixed frequency channel 160 where the data frames are time compressed and replicated for time diversity. The receiver 300 recovers the transmitted signal from the fixed frequency channel and recovers the data frames. An FHSS transmission source 150 provides periodic interference as described above. The receiver determines if any of the received data frames have been corrupted by signals from the interfering FHSS transmission source 150 and if there are corrupted data frames, uses the replicated data frames to recover the lost data frames.

Figure 5:
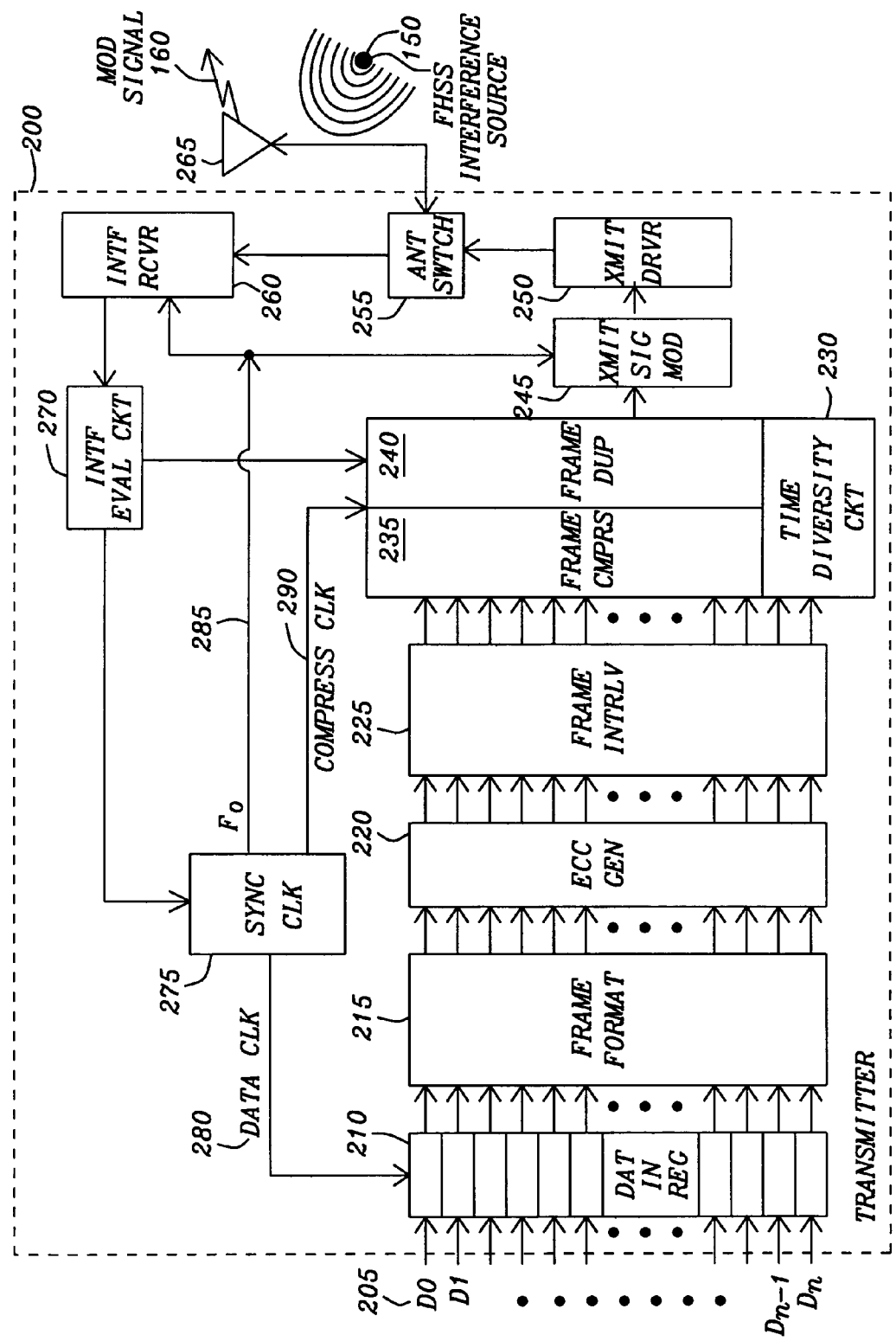
FIG. 5 is a transmitter of the communication system of this invention shown in FIG. 4.

The structure and operation of the transmitter 200 is described in FIG. 5. An audio signal is sampled and converted to for the digital data 205 that is the input to the data input register 210 of the transmitter 200. The digital data is retrieved by the frame formatter 215 from the data input register 210, compressed and formed into the data frames. The synchronization word and the start symbol 40 is appended to the data frames and then transferred from the frame formatter 215 to the error correction code generator 220. The error correction code generator 220 generates the forward error correction code that is appended to the serialized frames. The frame interleaving circuit 225 provides a hashing pattern of the digital data frames for minimizing the effects lost frames and permits a soft muting and interpolation between digital data frames in the audio applications.

The interleaved data frames are then transferred to the time diversity circuit 230. The time diversity circuit 230 includes a time compressing circuit 235 which compresses the data frames based on the transmission data rate multiplication factor as determined above. The time compressed data frames are then replicated in the frame duplication circuit 240 and serialized. The time diversity circuit 230 further appends the transmission data rate multiplication factor and the number of digital data frames within each replicated group. The serialized, compressed, and replicated data frames are transferred to the transmitter signal modulator 245. The transmitter signal modulator receives the fundamental frequency $F_o$ from the synchronizing clock circuit 275. The fundamental frequency $F_o$ is then modulated with the serialized, compressed and replicated data frames. The modulation techniques maybe any of the known amplitude, frequency, and phase keying modulation techniques that are known in the art.

The modulated fundamental signal is transferred to the transmitter driver 250 and from the transmitter driver 250 through the antenna switch 255 to drive the antenna 265 to radiate the modulated signal 160 to the atmosphere. At this same time, the FHSS source 150 transmits an FHSS signal 150 that may interfere with the modulated signal 160.

The antenna switch 255 is placed in the transmit mode during the transmission of the modulated signal 150 and into the receive mode during the reception of the interfering FHSS signal 150 or any interfering fixed frequency signals to determine which channels are available for transmission. The interfering FHSS signal 150 or the interfering fixed frequency signals impinge upon the antenna 265 to generate received interference signals that are transferred to the interference receiver 260. The fundamental frequency $F_o$ 285 is transferred interference receiver 260. The fundamental frequency $F_o$ 285 is used to capture the interfering FHSS signal 150 or any interfering fixed frequency signals. The recovered FHSS signal 150 or the interfering fixed frequency signal is transferred to the interference evaluation circuit 270. If the signature of the incoming signal indicates that the incoming signal is an interfering fixed frequency signal, the interference evaluation circuit 270 feeds a channel change signal to the synchronizing clock circuit 275. The clock circuit 275 changes the fundamental frequency $F_o$ 285 to another channel. The interference evaluation circuit 270 evaluates recovered received signal to determine its signature to determine if it is a interfering FHSS signal. If the incoming signal is an FHSS signal, the signature is the hopping pattern, duration of each hop, the total transmission duration, the magnitude of the transmission power relative to intended received power, and the bandwidth of the transmission during each hop.

If the signature information indicates that the incoming signal is the interfering FHSS signal 150, the signature of the interfering FHSS signal 150 is evaluated to determine the duration of for each channel is determined and the number of data frames which determine Yt is determined according to the formula of Eq. 1 above. The compression factor is also transferred to the synchronizing clock circuit 275 which is typically two (2).

Figure 6:
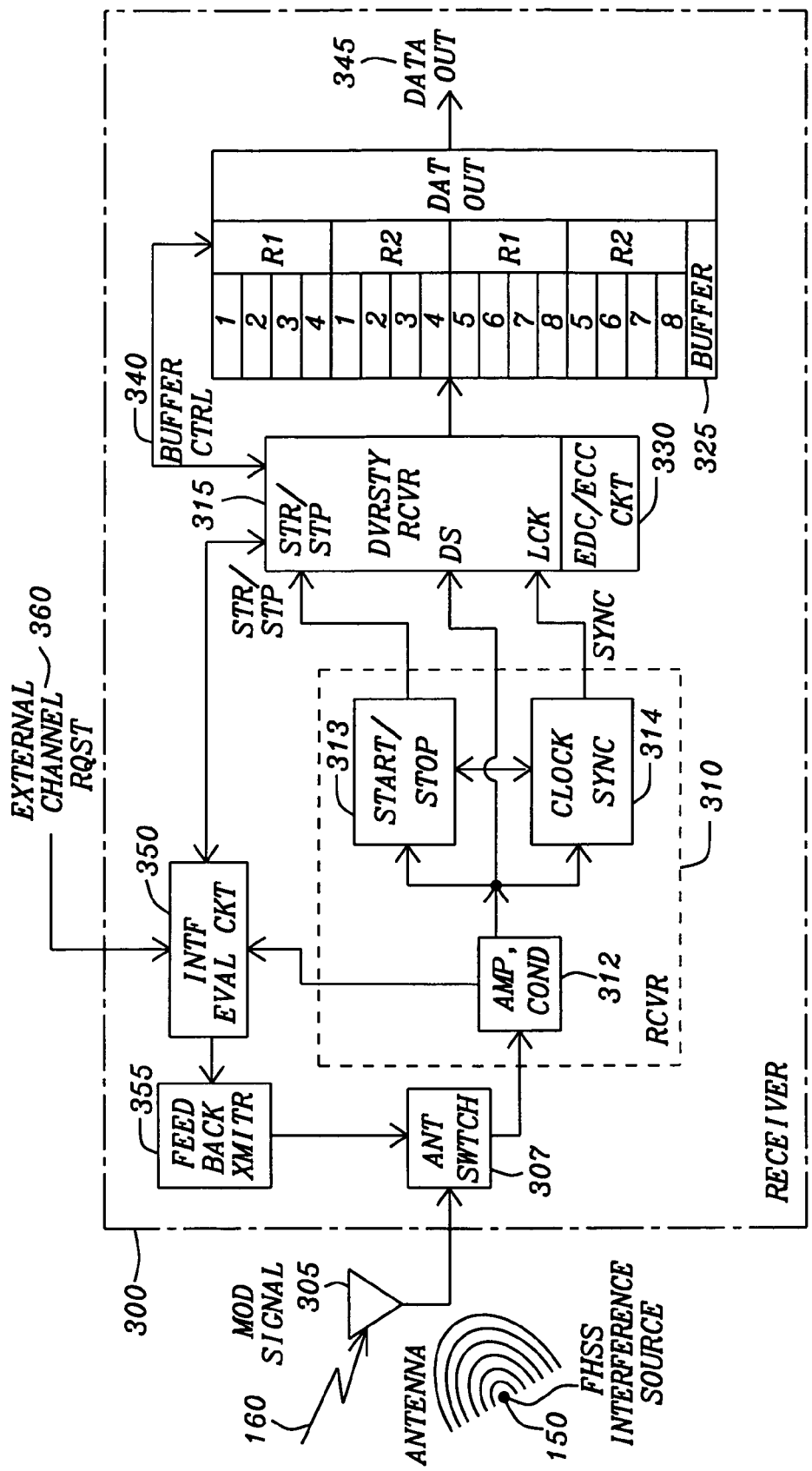
FIG. 6 is a receiver of the communication system of this invention shown in FIG. 4.

The modulated signal 160, the interfering FHSS signal 150 or any interfering fixed frequency signal, as shown in FIG. 6 are induced in the antenna 305 are applied to the receiver 300. The incoming signals are applied through the antenna switch 307 to the receiver input circuit 310. The amplifier, conditioner circuit 312 amplifies the modulated signal, demodulates the signal. The amplifier and conditioner circuit 312 transfers the received signal to the interference evaluator circuit 350, which determines if the signal is the desired signal or an undesired interfering FHSS signal 150 or an interfering fixed frequency signal. If it is an interfering fixed frequency signal, the amplifier and conditioner circuit 312 provides the feedback transmitter 355 with a request for a new channel for the transmission for the modulated signal 160. The feedback transmitter activates the antenna switch 307 to connect to the feedback transmitter 355 to the antenna 305. The feedback transmitter transmits a request for a new fixed frequency channel for the modulated signal 160. Once a clear channel is achieved the modulated signal 160 is then received by the amplifier and conditioner circuit 312.

If the interference evaluation circuit 350 determines that the undesired signal is an interfering FHSS signal 150, the interference evaluation circuit 350 evaluates the recovered received signal to determine its signature. The signature as described above is the hopping pattern, duration of each hop, the total transmission duration, the magnitude of the transmission power relative to intended received power, and the bandwidth of the transmission during each hop. The recovered digital data with the interleaving, compression, and replication is transferred to the start/stop circuit 313 to extract the start symbol from the digital data and to the clock synchronization circuit 314 which extracts the synchronization word. The start symbol and the synchronization word are used to allow the transmitter 200 and the receiver 300 to communicate The digital data signal is transferred to the diversity circuit 315. The diversity circuit 315 captures the digital data signal with the start symbol and the synchronization word. The diversity circuit 315 receives an interference evaluation signal from the interference evaluation circuit 350. The diversity circuit uses the evaluation signal to extract the transmission data rate multiplication factor and the number of digital data frames within each replicated group that are used by the transmitter 200 of FIG. 4 in time compressing and replicating the data frames. The transmission data rate multiplication factor is normally fixed for the communication system and is typically 2, but can be determined according to Eq. 1. The system adjusts the number of data frame length groupings within the FHSS signal 150 to avoid the FHSS interference duration.

The diversity circuit 315 communicates buffer control signals 340 with the buffer 325 to organize and arrange the locations of the incoming digital data frames. Each replication of the digital data frames are reassembled in proper sequence. Each set of the replications is further grouped for rapid access from the buffer 325. The buffer control signal 340 permits the necessary communication between the diversity circuit 315 and the buffer 325 for the allocation of the memory locations within the buffer 325 and the correct ordering of the digital data frames within the buffer 325.

Within the diversity circuit 315 is an error detection and correction circuit 330 that retrieves the ordered series of the primary replications of the digital data frames from the buffer 325. The error detection and correction circuit 330 evaluates each of the forward error correction codes of each data frame to determine if the data frame has been corrupted. If it is not in error, the digital data frames are of the first replication R1 is tagged as good and returned to the buffer 325. The redundant digital data frames R2 are not stored back to the buffer 325. If any the primary replication of the digital data frames are in error, the data frame of the redundant R2 digital data frames replaces the digital data frame of the primary digital data frames and the error detection and correction circuit 330 retrieves the primary replication of the digital data frames with the replicated data frame and evaluates each of the forward error correction codes of each data frame to determine if the data frame has been corrupted. If there is no error the replication is tagged as good and returned as the first replication R1. If there are no more replications, and the digital data frames are still in error, the digital data frame is tagged as in error and the next digital data frames are evaluated for errors.

Each of the digital data frames is transferred from the buffer 325 to its data output section for re-conversion, in the case of digital audio transmission, to an analog signal for reproduction in a speaker or earphones. The data output section examines the data tagging of each of the digital data frames. If the frame is not corrupted, it is transferred for reproduction. However, if any of the primary digital data frames are tagged in error, an error notification signal is communicated from the error detection and correction circuit 330 to the reproduction circuitry. Upon receiving the error notification signal, the subsequent processing either interpolates the values of adjacent data frames or soft mutes the output signal for the period of the interference.

If there are large numbers of corrupting digital data frames that are tagged not good, the diversity circuit 315 transmits the status to the interference evaluation circuit 350. The interference evaluation circuit 350 generates a message containing the transmission data rate multiplication factor and the number of digital data frames within each replicated group and transfers it to the feedback transmitter 355. The feedback transmitter 355 activates the antenna switch 307 and transmits the message to the receiver of the transmitter 200. The transmitter 200 will then readjust the transmission data rate multiplication factor and the number of digital data frames within each replicated group for re-transmission. Alternately, if the data out 345 is grossly corrupted that it is unusable, an external channel request 360 is generated and transferred to the interference evaluation circuit 350. The interference evaluation circuit 350 generates a message containing the transmission data rate multiplication factor and the number of digital data frames within each replicated group and transfers it to the feedback transmitter 355. The feedback transmitter 355 activates the antenna switch 307 and transmits the message to the receiver of the transmitter 200, as described above. The transmitter 200 will then readjust the transmission data rate multiplication factor and the number of digital data frames within each replicated group for re-transmission.

Figure 7:
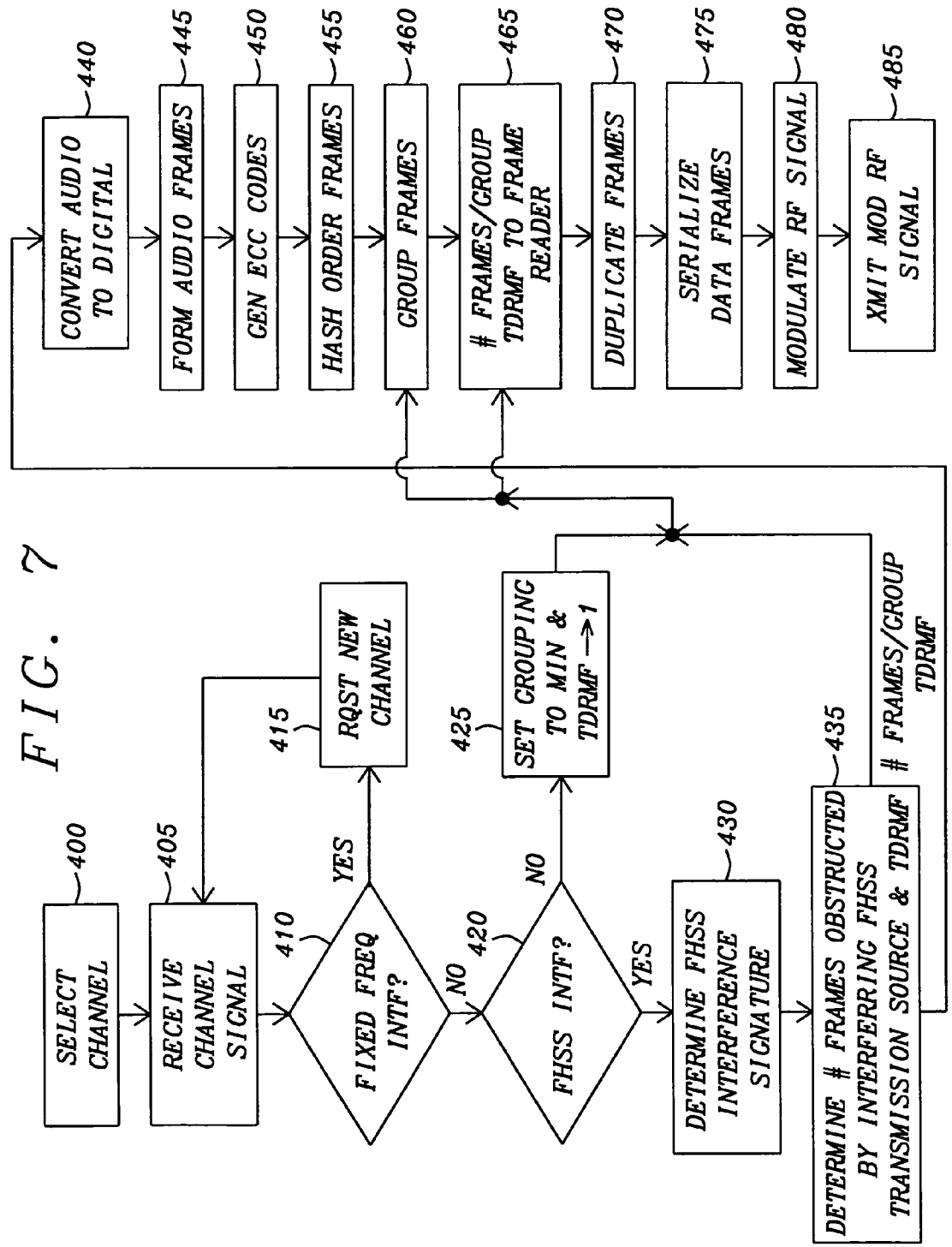
FIG. 7 is a process diagram for transmission of digital data employing time compression and diversity of this invention.

Refer now to FIG. 7 for a discussion of the method of this invention for transmission of a fixed frequency signal in the presence of FHSS interfering signals. A fixed frequency channel is selected (Box 400) and any signals on the selected channel are received and evaluated. (Box 405). The evaluation determines (Box 410) whether there is a fixed frequency interference source. If there is a fixed frequency interference source present, a new frequency channel is requested (Box 415). The new channel is selected (Box 400), received, and evaluated (Box 405). If there is no fixed frequency interference source present, the received and evaluated signal is then further evaluated (Box 420) for a FHSS interfering transmission source. If there is no interfering FHSS interfering transmission source present, the transmission data rate multiplication factor is set to one (i.e. no multiplication of the data rate) and a minimum number of data frame groupings is chosen (Box 425).

If there is an interfering FHSS transmission source present, the signature of the FHSS transmission source is determined (Box 430). The signature is the hopping pattern, duration of each hop, the total transmission duration, the magnitude of the transmission power relative to intended received power, and the bandwidth of the transmission during each hop. From the signature of the FHSS transmission source, the number of frames obstructed by the interference FHSS transmission source is determined (Box 435) to assign a likely number of digital data frame groupings required. Further, from the number of frames obstructed by the FHSS transmission source interference, the transmission data rate multiplication factor is calculated (Box 435) as shown in Eq. 1.

In a digital audio application, the audio signal is converted (Box 440) to a sampled digital signal and formed (Box 445) into digital audio frames. A forward error correction code is generated (Box 450) and appended to the digital audio frames. The digital audio frames are then hashed (Box 455) in order to prevent errors that can not be interpolated or muted completely.

Based on the number of digital data frame groupings and the transmission data rate multiplication factor (TDRMF), the digital data frames are grouped (Box 460). The number of digital data frames within each grouping and the transmission data rate multiplication factor are appended (Box 465) to the header of each of the digital data frames. A receiver will examine each data frame to recover the number of digital data frame groupings and the transmission data rate multiplication factor. The digital data frames are replicated (Box 470) and serially streamed (Box 475). The number of digital data frames may be fixed four but maybe any number to guarantee that the digital data frames are not destroyed by the interference from FHSS transmission sources. Further, the transmission data rate multiplication factor is set at two to have a two copies of each grouping of digital data frames, but again the number of replications maybe any number dependent on the amount of interference from the FHSS transmission source that is allowable and calculated from Eq. 1 above. An RF signal is modulated (Box 480) with the time compressed and replicated data frames that are serialized and transmitted (Box 485).

Figure 8A:
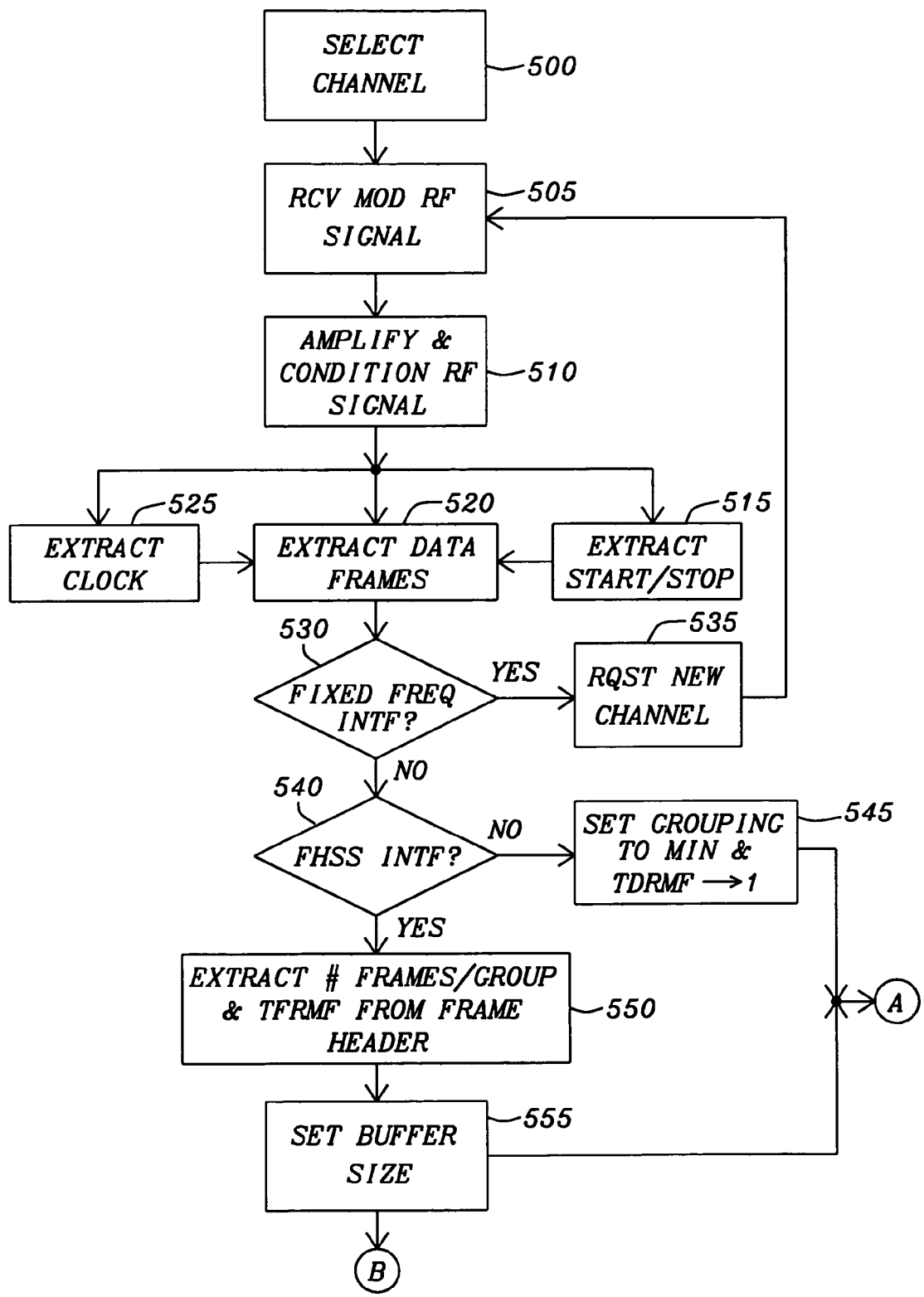
FIGS. 8a and 8b is a process diagram for reception of digital data employing time compression and diversity of this invention.
Figure 8B:
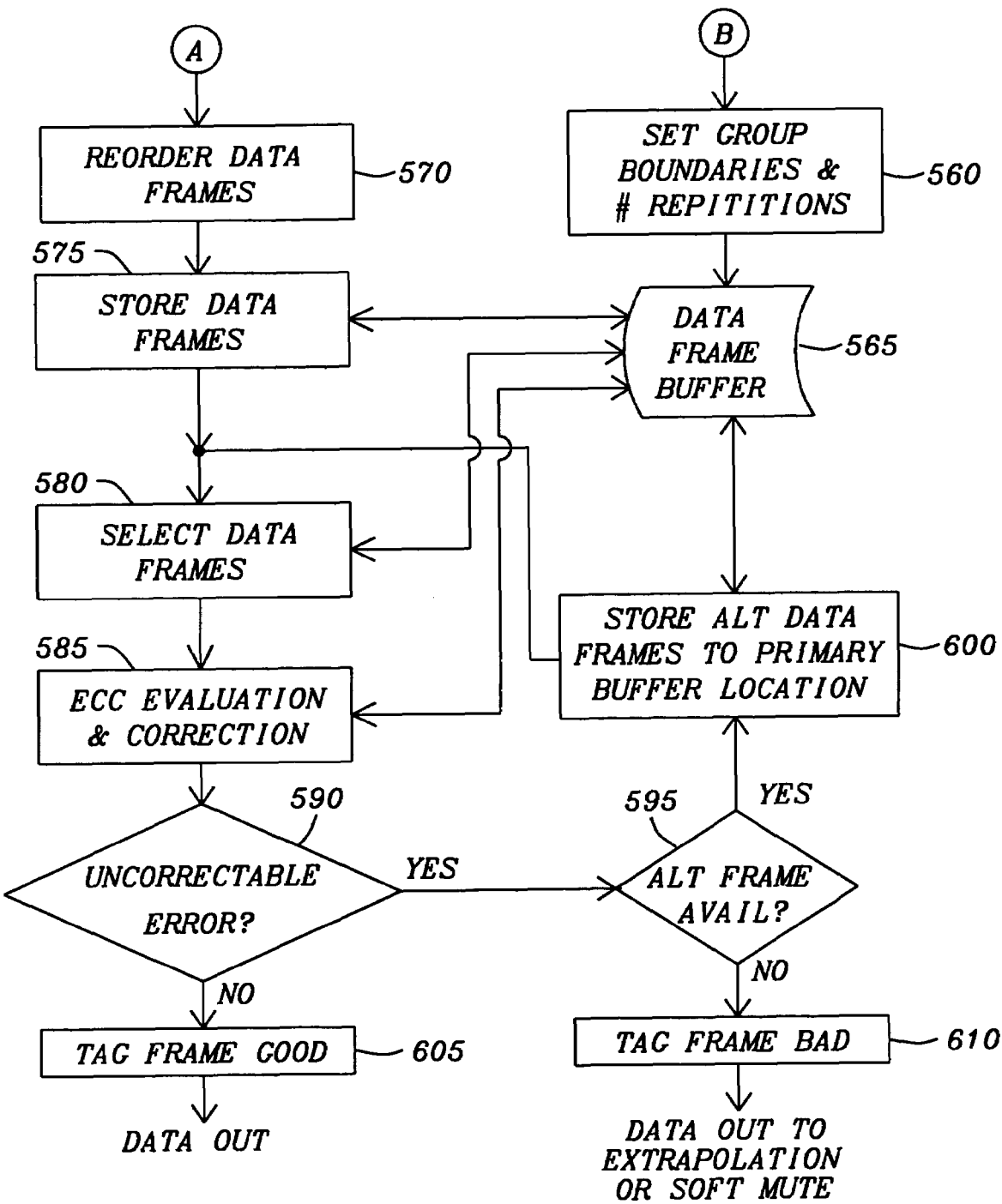

The method for reception of a fixed frequency modulated RF signal in the presence of FHSS interfering signals is shown in FIGS. 8a and 8b. A fixed frequency channel is selected (Box 500) and an RF modulated RF signal is received (Box 505). The received modulated RF signal is amplified and conditioned (Box 510) to demodulate the RF signal to extract the modulating digital data. The start symbol and the synchronizing clock are extracted (Boxes 515 and 520). The data frames are then synchronized and extracted (Box 525). The extracted data frames are then evaluated (Box 530) to determine if the received modulated signal is an interfering fixed frequency RF signal. If the signal is an interfering fixed frequency signal, the receiver requests (Box 535) that the transmitter change the fixed frequency channel to another fixed frequency channel within the allocated RF band and the RF modulated signal is received (Box 505), amplified and conditioned (Box 510), and the digital data frames extracted (Box 525). When the clear fixed frequency channel is determined (Box 530), the data frames are then examined (Box 540) if the received modulated RF signal is an FHSS interfering signal. If there is no FHSS interfering signals present, the transmission data rate multiplication factor is set to one (i.e. no multiplication of the data rate) and a minimum number of data frame groupings is chosen (Box 545).

If the received modulated RF signal is an FHSS interfering signal. If there are FHSS interfering signals present, the number of digital data frames within each grouping and the transmission data rate multiplication factor are extracted from the header (Box 550). From the number of digital data frames within each grouping and the transmission data rate multiplication factor, a buffer size and location is allocated (Box 560) and communicated to the buffer 565. The data frames are reordered (Box 570) to the correct order and the data frames are stored (Box 575) in the data buffer 565. The ordered series of the primary replications of data frames are selected and retrieved (Box 580) from the data buffer 565. The ordered series of primary replications of the data frames have their error correction codes evaluated (Box 585) to determine if any corruption of the data has occurred in transmission. If the errors are correctable, they are corrected. The corrected ordered series of primary replications of the data frames are then stored again to the buffer 565. The data frames are then evaluated for uncorrectable errors (Box 590). If there are no uncorrected errors, the data frames are tagged (Box 605) as "good" and scheduled for transfer for other processing such as conversion to audio signals for reproduction on speakers or headphones.

If there are uncorrectable errors, the existence of alternate ordered series of the data frames is determined (Box 295). If there is an alternate replicated ordered series of the data frames, the alternate set of the data frames are selected, retrieved, and stored (Box 600) in the locations of the primary replications of the data frames in the data buffer 565. The ordered series of the primary replications of data frames are again selected and retrieved (Box 580) from the data buffer 565. The ordered series of primary replications of the data frames have their error correction codes again evaluated (Box 585) to determine if any corruption of the data has occurred in transmission. If the errors are correctable, they are corrected. The corrected ordered series of primary replications of the data frames are then stored again to the buffer 565. The data frames are then evaluated for uncorrectable errors (Box 590). If there are no uncorrected errors, the data frames are tagged (Box 605) as "good" and scheduled for transfer for other processing such as conversion to audio signals for reproduction on speakers or headphones.

If there are still uncorrectable errors, the existence of alternate ordered series of the data frames is again determined (Box 595). If any other alternate replications of the data frames exist, the process is repeated. If no other alternate replications of the data frames exist, the data frames are tagged (Box 610) and the data frames that have been corrupted and are missing data frames are scheduled for transfer for other processing where they are interpolated from adjacent data frames to create an estimate of the lost data frames or the audio signal is muted for the period of the lost data frames.

If there are large numbers of corrupting digital data frames that are tagged not good, a message containing the transmission data rate multiplication factor and the number of digital data frames within each replicated group is generated and transferred the transmission device. The transmission device then readjusts the transmission data rate multiplication factor and the number of digital data frames within each replicated group for re-transmission.

As noted above there is a maximum allowable latency delay for the reproduction of audio signal to qualify for audio/video application is 20 msec. All the digital conversion, encoding compression, time diversity replication, error correction, decoding and re-conversion to an audio signal must be completed within this latency period.

One of the primary sources of interference for the fixed frequency communication system of this invention is the well known Bluetooth personal area network specification. The Bluetooth specification requires operation on the ISM RF bands and employs an FHSS scheme using 1600 Hops/sec over 79 channels. Each channel of the Bluetooth specification has a bandwidth of 1 MHz (measured @—20 dBc) and the hopping sequence is a segmented pseudo random non repetitious code.

In an implementation of the preferred embodiment of the communication of this invention, the channel bandwidth is approximately 8 MHz. The probability of the Bluetooth FHSS interfering with the fixed frequency transmission of this communication system is 8/79 and each Bluetooth excursion through the 79 channels is 49.375 msec. The worst case situation has 8 hopping sequences within the 8 MHz transmission bandwidth of this communication system of this invention. The duration of the eight (8) consecutive hits within the bandwidth is 8*625 μsec=5 msec. The digital data frames to be transmitted must replicated and placed at least 5 msec apart which is the value of the time $Y_t$ 130 of FIG. 3a. Placing the replicated data frames beyond the 5 msec sets the probability of having errors under such system will at:

$$8/79*7/78*6/77*5/76*4/75*3/74*2/73*1/72*0/71=0.$$

This guarantees that no error will occur due to the Bluetooth interference.

While it is preferable to compress and replicate the data frames to eliminate the FHSS interfering signals, even setting the time $Y_t$ 130 to a smaller value and thus the compression factor to a smaller value will provide improvement over no compression and replication of this invention. For instance, if the time diversity is set to 2 msec ($Y_t$ 130) versus the 5 msec ($Y_t$ 130) described above. The 2 msec encompasses more than 3 consecutive hops (2/0.625=3.2) within the transmission bandwidth will cause error. The probability of having errors under such system is then calculated as:

$$8/79*7/78*6/77*5/76=4.65\times10^{-5}$$

This means that one error will occur every 17.7 min. The time $Y_t$ 130 and thus the number of data frames included within the grouping can be balanced versus the error rate to achieve an optimum design point.

Another source of FHSS interference is from cordless telephones. The cordless telephones as available at the present time employ an FHSS scheme with 100 Hops/sec over 90 channels. Each channel has approximately 800 KHz bandwidth with a pseudo random code hopping code. The probability of a cordless telephone interfering within each hopping cycle is 10/90 (each cycle of cordless hopping is 900 msec). The worst case includes ten consecutive hopping sequences inside the fixed frequency transmission channel. The duration of 10 consecutive hits is 10*10 msec=100 msec. For complete protection the time diversity $Y_t$ 130 must be at least 100 msec apart for subsequent repeat of the block. This value is excessively large and can be decreased to a time diversity $Y_t$ 130 of, for instance, 30 msec. The time diversity time $Y_t$ 130 of FIG. 3a covers the data frame time for 3 consecutive hops (30/10=3) of the FHSS interference within the fixed frequency channel. The probability of having errors under such system will then be:

$$10/90*9/89*8/88*7/87=8.21\times10^{-5}$$

This error rate translates to one error in every 3 hours ((90*10 msec)/8.21×10⁻⁵).

Again as can be seen, the compression and replication of the communication system of this invention allows for wireless transmission of digitized audio signals on ISM RF allocated bands in the presence of FHSS interference and maintain acceptable error rates.

While this invention has been particularly shown and described with reference to the preferred embodiments thereof, it will be understood by those skilled in the art that various changes in form and details may be made without departing from the spirit and scope of the invention.

The invention claimed is:

1. A communication system for the transfer of digital data frames on a fixed frequency channel in the presence of interference from at least one frequency hopping spread spectrum interference source, said communication system comprising
a transmitter including:
a time diversity generation circuit comprising:
a frame data rate multiplier to receive data frames to increase a data transfer rate of at least one grouping of said data frames to time compress said groupings of said data frames; and
a data frame duplicator in communication with said frame data rate multiplier to receive said time compressed groupings of data frames, and duplicate said time compressed groupings of said data frames;
wherein said frame data rate multiplier increases the data transfer rate and the data frame duplicator duplicates the time compressed grouping of said data frames as a function of a transmission data rate multiplication factor and a data frame length grouping number indicative of a number of data frames included within a grouping such that the time compressed and duplicated grouping of said data frames can avoid said interference; and
wherein said duplicated time compressed groupings of data frames are transmitted serially by said transmitter on a fixed frequency channel in the presence of said interference to allow reception of all time compressed groupings of data frames in spite of said interference.

2. The communication system of claim 1 further comprising:
a receiver comprising:
a time diversity data recovery circuit comprising:
a diversity receiver to receive said duplicated time compressed data frames that are transmitted on a fixed frequency channel in the presence of interference from at least one frequency hopping spread spectrum interference source and extract the duplicated time compressed data based on a transmission data rate multiplication factor and a data frame length grouping number,
a data frame buffer in communication with said diversity receiver to receive said transmission data rate multiplication factor and said data frame length grouping number to allocate buffer locations within said data frame buffer and to receive said duplicated time compressed data frames, and an error detection and correction circuit in communication with said data frame buffer to retrieve sequentially said duplicated time compressed data frames, to evaluate whether each of said duplicated time compressed data frames are received correctly and if not received correctly whether they have been destroyed by said interference, if any one of said duplicated time compressed data frames is destroyed retrieving a copy of said destroyed duplicated time compressed data frame to recover said data frame;

wherein data frame buffer orders said duplicated time compressed data frames in order locations to allow ordered retrieval of said data frames by said error detection and correction circuit.

3. The communication system of claim 2 wherein the time diversity data recovery circuit further comprises a recovery interference evaluation circuit within said receiver to said receive an interfering signal of said frequency hopping spread spectrum interference source;

from said interfering signal; said recovery interference evaluation circuit derives an interference signature indicative of a hopping pattern, duration of each hop, a total transmission duration, a magnitude of the transmission power relative to intended received power, and a bandwidth of the transmission during each hop; and from said interference signature, said recovery interference evaluation circuit evaluates said transmission data rate multiplication factor and said data frame length grouping number indicative of a number of data frames included within said grouping and said data transfer rate, which can avoid said interfering signal.

4. The communication system of claim 3 wherein said recovery interference evaluation circuit communicates an interference notification signal to said diversity receiver, wherein said diversity receiver extracts an embedded transmission data rate multiplication factor and an embedded data frame length grouping number from a header of said duplicated time compressed data frames.

5. The communication system of claim 3 if recovered data frames are not correctable as a result of interference from said frequency hopping spread spectrum source, said interference evaluation circuit communicates a request for a new transmission data rate multiplication factor and a new data frame length grouping number to a communication transmitter transmitting on said fixed frequency channel.

6. The communication system of claim 3 wherein if recovered data frames are not correctable as a result of interference from said frequency hopping spread spectrum source, said interference evaluation circuit receives an external channel request to communicate said request for said new transmission data rate multiplication factor and said new data frame length grouping number to said communication transmitter transmitting on said fixed frequency channel.

7. The communication system of claim 1 wherein the time diversity generation circuit further comprises a generation interference evaluation circuit in communication with a receiver associated with said transmitter to receive an interfering signal from said at least one frequency hopping spread spectrum source:

from said interfering signal; said generation interference evaluation circuit derives an interference signature indicative of a hopping pattern, duration of each hop, a total transmission duration, a magnitude of the transmission power relative to intended received power, and a bandwidth of the transmission during each hop; and from said interference signature, said generation interference evaluation circuit evaluates the transmission data rate multiplication factor and the data frame length grouping number indicative of the number of data frames included within the grouping and said data transfer rate, which can avoid said interfering signal.

8. The communication system of claim 7 wherein said generation interference evaluation circuit is in communication with said frame data multiplier to receive said transmission data rate multiplication factor to determine said data transfer rate for each grouping of data frames and in communication with said data frame duplicator to receive said data frame length grouping number to determine the number of data frames include in each grouping of data frames.

9. The communication system of claim 7 wherein said receiver receives a feedback message transmitted from a remote receiving system, said message containing the transmission data multiplication factor and the data frame length grouping number, said message being transferred to said interference evaluation circuit for transfer to said frame data rate multiplier and said data frame duplicator for time compressing said groupings of said data frames and duplicating said time compressed data frames.

10. The communication system of claim 1 wherein said duplications of the time compressed groupings of data frames is two.

11. The communication system of claim 1 wherein said data transfer rate is a function of a transmission data rate multiplication factor that is determined by a number of data frames within said grouping obstructed by said in interference and a bandwidth of said interference.

12. The communication system of claim 11 wherein said transmission data rate multiplication factor and said data frame length grouping number is placed within a header of said data frames.

13. The communication system of claim 11 wherein said transmission data rate multiplication factor is two.

14. The communication system of claim 1 wherein said transmission data rate multiplication factor is determined by the formula:

$$TDRMF = \lceil \frac{N_f}{n}$$

where:

TDRMF is the transmission data rate multiplication factor, $\lceil$ is the next greatest integer or the result of rounding up to the next greatest integer (ceiling), $$N_f = \lceil \frac{t_{window}}{t_{frame}},$$

$N_f$ is the data frame length grouping number indicative of the number of data frames in a window and is an integer multiple for the duration of the data frame, $t_{window}$ is the maximum time of the window in which data frames are duplicated, $t_{frame}$ is the duration for each data frame, $$n = \lceil \frac{m\tau_{FHSS}}{t_{frame}} \rceil,$$

n is the number of frames obstructed by the interference, m is the number of FHSS channels within the fixed frequency channel, and $\tau_{FHSS}$ is frequency hopping spread spectrum channel interference duration.

15. The communication system of claim 1 wherein at least one of said frequency hopping spread spectrum interference sources is a Bluetooth compliant source.

16. The communication system of claim 1 wherein at least one of said frequency hopping spread spectrum interference sources is a cordless telephone.

17. A method for the transfer of digital data on a fixed frequency channel in the presence of interference from at least one frequency hopping spread spectrum interference source, said method comprising the steps:
    transmitting said digital data including the steps of:
        generating time diversified digital data frames comprising the steps of:
            receiving interleaved data frames,
            receiving a transmission data rate multiplication factor and a data frame length grouping number indicative of a signature of a frequency hopping spread spectrum channel interference source characteristics,
            compressing a duration of said interleaved data frames to allow duplication of said interleaved data frames to a duration such that interference from said at least one frequency hopping spread spectrum interference source can be avoided,
            duplicating the time compressed formatted frames of data, and
            transmitting by a transmitter said duplicated time compressed frames of data on a fixed frequency channel in the presence of said interference to allow reception of all compressed interleaved data frames in spite of said interference.

18. The method for the transfer of digital data of claim 17 further comprising the steps of:
    receiving said digital data by the steps of:
        recovering said duplicated time compressed frames of data comprising the steps of:
            receiving duplicated time compressed data frames that are transmitted on a fixed frequency channel in the presence of the interference from at least one frequency hopping spread spectrum interference source;
            allocating buffer locations within a data frame buffer from said transmission data rate multiplication factor and said data frame length grouping number;
            receiving said duplicated time compressed data frames to said allocated buffer locations within said data frame buffer;
            ordering said duplicated time compressed data frames in ordered locations to allow ordered retrieval of said data frames by an error detection and correction circuit
            retrieving sequentially said duplicated time compressed data frames;
            evaluating whether each of said duplicated time compressed data frames are received correctly;
            if not received correctly, determining whether they have been destroyed by said interference; and
            if any one of said duplicated time compressed data frames is destroyed, retrieving a copy of said destroyed duplicated time compressed data frame to recover said data frame.

19. The method for the transfer of digital data of claim 18 wherein generating time diversified digital data frames further comprises a step of evaluating a received frequency hopping spread spectrum signal from said frequency hopping spread spectrum channel interference source to determine said signature of said frequency hopping spread spectrum channel interference source characteristics.

20. The method for the transfer of digital data of claim 19 wherein said signature is indicative of a hopping pattern, duration of each hop, a total transmission duration, a magnitude of the transmission power relative to intended received power, and a bandwidth of the transmission during each hop.

21. The method for the transfer of digital data of claim 19 wherein for generating time diversified digital data frames, said step of evaluating said received frequency hopping spread spectrum signal from said frequency hopping spread spectrum channel interference source determines a transmission data rate multiplication factor and a data frame length grouping number indicative of a number of data frames included within a grouping and a data transfer rate, which can avoid said interfering signal.

22. The method for the transfer of digital data of claim 21 further comprising the step of determining said compression factor by the formula:

$$: TDRMF = \lceil \frac{N_f}{n} \rceil$$

TDRMF is the transmission data rate multiplication factor, $\lceil$ is the next greatest integer or the result of rounding up to the next greatest integer (ceiling), $$N_f = \lceil \frac{t_{window}}{t_{frame}} \rceil,$$

$N_f$ is the data frame length grouping number indicative of the number of data frames in a window and is an integer multiple for the duration of the data frame, $t_{window}$ is the maximum time of the window in which data frames are duplicated, $t_{frame}$ is the duration for each data frame, $$n = \lceil \frac{m\tau_{FHSS}}{t_{frame}} \rceil,$$

n is the number of frames obstructed by the interference, m is the number of FHSS channels within the fixed frequency channel, and $\tau_{FHSS}$ is frequency hopping spread spectrum channel interference duration.

23. The method for the transfer of digital data of claim 21 wherein said transmission data rate multiplication factor is two.

24. The method for the transfer of digital data of claim 18 wherein recovering a said duplicated time compressed frames of data further comprises the step of extracting said transmission data rate multiplication factor and a data frame length grouping number utilized in creating said duplicated time compressed data frames from headers of said time compressed data frames.

25. The method for the transfer of digital data of claim 18 wherein recovering said duplicated time compressed frames of data further comprises a step of evaluating a received frequency hopping spread spectrum signal from said frequency hopping spread spectrum channel interference source to determine said signature of said frequency hopping spread spectrum channel interference source characteristics.

26. The method for the transfer of digital data of claim 25 wherein said signature is indicative of a hopping pattern, duration of each hop, a total transmission duration, a magnitude of the transmission power relative to intended received power, and a bandwidth of the transmission during each hop.

27. The method for the transfer of digital data of claim 26 wherein recovering said duplicated time compressed frames of data further comprises a step of evaluating said received frequency hopping spread spectrum signal from said frequency hopping spread spectrum channel interference source determines a transmission data rate multiplication factor and a data frame length grouping number indicative of a number of data frames included within a grouping and a data transfer rate, which can avoid said interfering signal.

28. The method for the transfer of digital data of claim 18 wherein recovering said duplicated time compressed frames of data further comprises a step of communicating a request for a new transmission data rate multiplication factor and a new data frame length grouping number to a communication transmitter transmitting on said fixed frequency channel, if said recovered data frames are not correctable as a result of interference from said frequency hopping spread spectrum interference source.

29. The method for the transfer of digital data of claim 28 wherein recovering a said duplicated time compressed frames of data further comprises a step of receiving an external channel request to communicate said request for said new transmission data rate multiplication factor and said new data frame length grouping number to said communication transmitter transmitting on said fixed frequency channel, if recovered data frames are not correctable as a result of interference from said frequency hopping spread spectrum source.

30. The method for the transfer of digital data of claim 17 wherein duplicating of the time compressed formatted frames of data creates two duplications.

31. The method for the transfer of digital data of claim 17 wherein said at least one frequency hopping spread spectrum interference sources is a Bluetooth compliant source.

32. The method for the transfer of digital data of claim 17 wherein said at least one frequency hopping spread spectrum interference source is a cordless telephone.

* * * * *